US011921453B2

(12) United States Patent
Yamada et al.

(10) Patent No.: US 11,921,453 B2
(45) Date of Patent: Mar. 5, 2024

(54) IMAGE FORMING APPARATUS

(71) Applicants: Shintaro Yamada, Tokyo (JP); Akihiro Kawasaki, Kanagawa (JP); Hiroaki Katoh, Kanagawa (JP)

(72) Inventors: Shintaro Yamada, Tokyo (JP); Akihiro Kawasaki, Kanagawa (JP); Hiroaki Katoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/976,899

(22) Filed: Oct. 31, 2022

(65) Prior Publication Data

US 2023/0135510 A1 May 4, 2023

(30) Foreign Application Priority Data

Nov. 2, 2021 (JP) ................................ 2021-179749

(51) Int. Cl.
*G03G 15/08* (2006.01)
*G03G 9/08* (2006.01)
*G03G 15/00* (2006.01)

(52) U.S. Cl.
CPC ....... *G03G 15/6585* (2013.01); *G03G 9/0819* (2013.01); *G03G 2215/00797* (2013.01)

(58) Field of Classification Search
CPC ............ G03G 9/0819; G03G 15/0815; G03G 15/6585; G03G 15/6591; G03G 2215/00021; G03G 2215/00801; G03G 2215/0636
See application file for complete search history.

(56) References Cited

U.S. PATENT DOCUMENTS

| | | | | |
|---|---|---|---|---|
| 2009/0041512 | A1 | 2/2009 | Murayama et al. | |
| 2009/0208252 | A1 | 8/2009 | Nakagawa et al. | |
| 2010/0028057 | A1 | 2/2010 | Yamada et al. | |
| 2011/0206429 | A1 | 8/2011 | Terao et al. | |
| 2016/0209774 | A1 | 7/2016 | Abe et al. | |
| 2020/0192239 | A1* | 6/2020 | Hirai .................. | G03G 15/6582 |

FOREIGN PATENT DOCUMENTS

| | | |
|---|---|---|
| JP | 11-143150 | 5/1999 |
| JP | 2006-313380 | 11/2006 |
| JP | 2009-075400 | 4/2009 |
| JP | 2011-197634 | 10/2011 |

* cited by examiner

*Primary Examiner* — Hoang X Ngo
(74) *Attorney, Agent, or Firm* — XSENSUS LLP

(57) ABSTRACT

An image forming apparatus includes a latent image forming device and a visualizing device. The latent image forming device forms a latent image with an adhesive on a base material. The visualizing device causes particles to adhere to the latent image to visualize the latent image as an uneven image. The particles each contains an insoluble substance.

14 Claims, 18 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2021-179749, filed on Nov. 2, 2021, in the Japan Patent Office, the entire disclosure of which is hereby incorporated by reference herein.

BACKGROUND

Technical Field

The present disclosure relates to an image forming apparatus that causes particles each containing an insoluble substance to adhere to a base material to form an uneven image.

Discussion of the Background Art

A typical electrophotographic image forming apparatus is difficult to form an uneven image (dot) having a height of several hundred μm like a Braille character because the particle diameter of toner for use is too small (several μm). Therefore, it has been proposed to form an uneven image (dot) having a height of about sub mm by adding a foaming agent to the toner and foaming the foaming agent with a fixing device.

SUMMARY

In an embodiment of the present disclosure, an image forming apparatus includes a latent image forming device and a visualizing device. The latent image forming device forms a latent image with an adhesive on a base material. The visualizing device causes particles to adhere to the latent image to visualize the latent image as an uneven image. The particles each contains an insoluble substance.

DETAILED DESCRIPTION

Figure 1A:
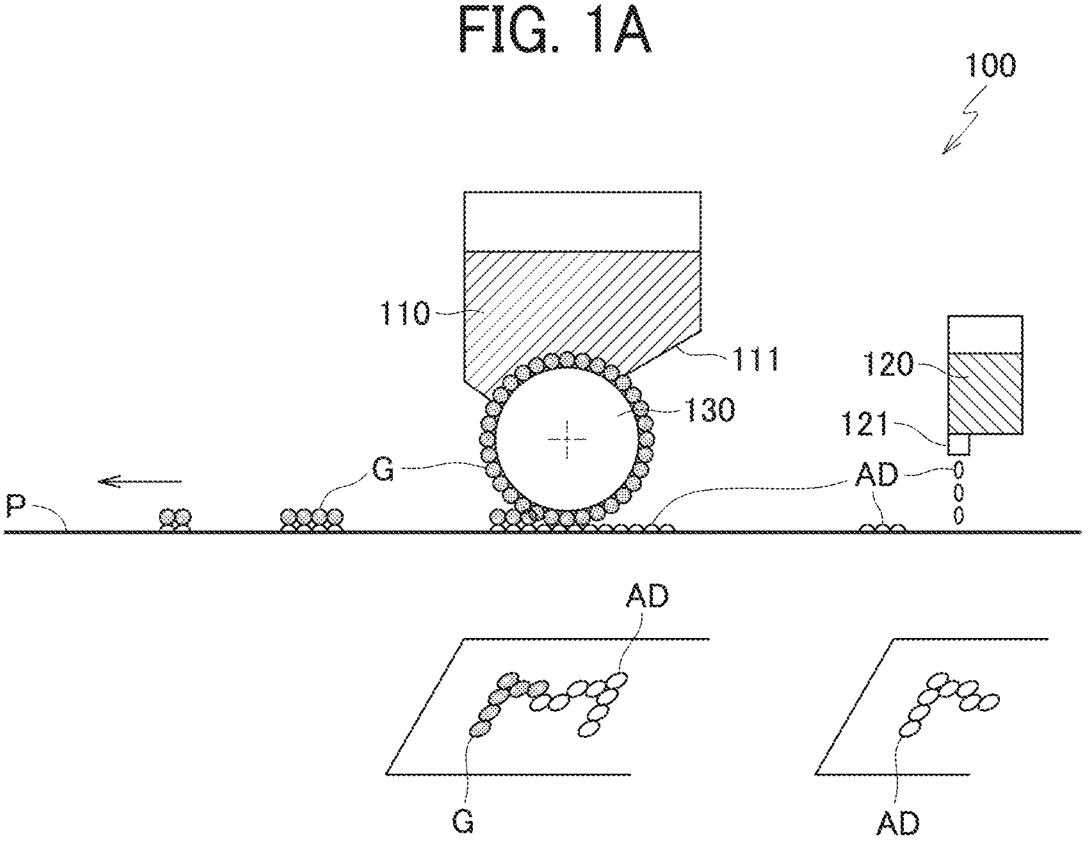
FIG. 1A is a schematic configuration view of an image former according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments are described with reference to the accompanying drawings. In order to facilitate understanding of the description, the same components in the drawings are denoted by the same reference numerals as much as possible, and redundant description is omitted.

As described above, a typical electrophotographic image forming apparatus may be difficult to form an uneven image (dot) having a height of several hundred μm like a Braille character because the particle diameter of toner for use is too small (several μm). Therefore, it has been proposed to form an uneven image (dot) having a height of about sub mm by adding a foaming agent to the toner and foaming the foaming agent with a fixing device. However, it may be difficult to set the foaming agent, the fixing pressure, and the fixing temperature in a well-balanced manner. In addition, it may be difficult to ensure the strength of the dot because a void is formed in the dot, and it may be also difficult to ensure the wear resistance because the toner density in the dot decreases.

On the other hand, in order to satisfy the height and strength of a dot, a technique of forming an uneven image (dot) with particles having an insoluble substance as a core has also been proposed. However, when the particle diameter to be used is small, several tens of toner layers may be laminated in order to form an uneven image (dot) having a height of about sub mm. When the toner layer is multi-layered, it may be difficult to obtain a sufficient strength of the uneven image (dot).

As described below, according to an embodiment of the present disclosure, an uneven image having sufficient height and strength can be easily formed.

Figure 1B:
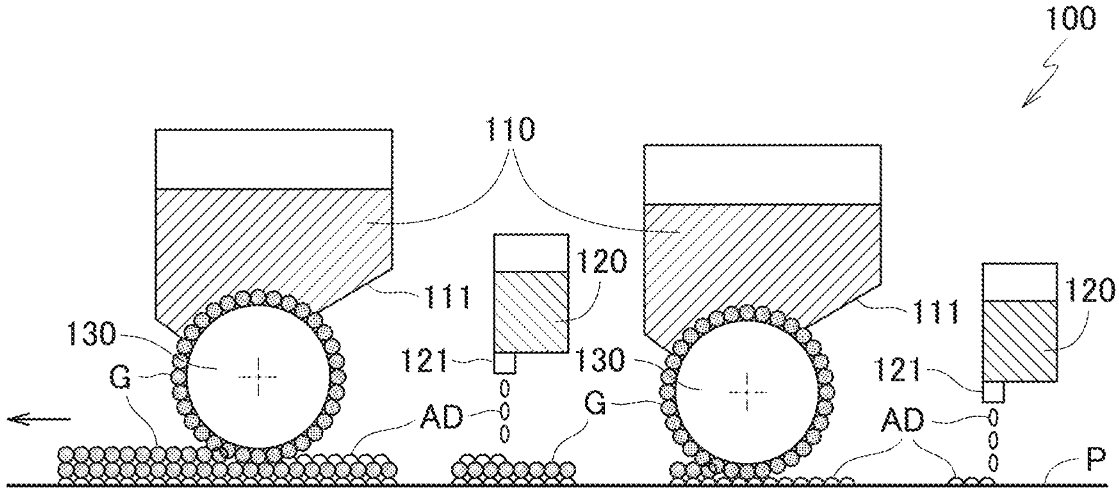
FIG. 1B is a schematic configuration view of an image former according to an embodiment of the present disclosure.
Figure 1C:
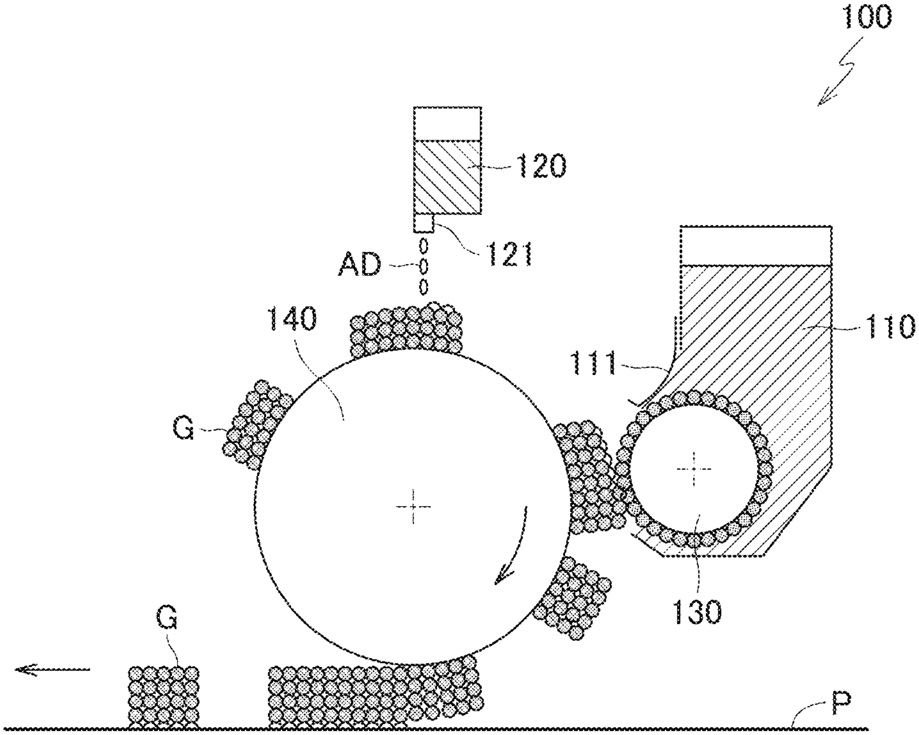
FIG. 1C is a schematic configuration view of an image former according to an embodiment of the present disclosure.

Hereinafter, embodiments of the present disclosure will be described with reference to the drawings. FIGS. 1A to 1C each illustrate an image former 100 according to an embodiment of the present disclosure. The image former 100 is a combination of large-diameter particle layer formation using a conventional electrophotography and adhesive-agent layer formation using a conventional inkjetting.

Large diameter particles G are larger in diameter than toner for use in conventional electrographic image formation systems. Thus, an uneven image having a thickness of several hundred μm or more can be formed on a sheet P. The uneven image can obtain image stability corresponding to the image stability of an electrophotographic image, and can be developed to a field such as Braille-character formation requiring unevenness of about several hundred μm.

Basic Configuration of Image Former

FIG. 1A illustrates the basic configuration of the image former 100. The image former 100 includes a particle tank 110 storing particles and an adhesive agent tank 120 storing an adhesive agent AD as an adhesive. The particle tank 110 and the adhesive agent tank 120 are disposed in this order from the upstream side in the conveyance direction along a conveyance path for a sheet P as a base material.

Particles each having a particle diameter of 20 μm or more are stored in the particle tank 110. A drum-shaped particle bearer 130 is disposed rotatably at the bottom of the particle tank 110. The rotation axis of the particle bearer 130 is disposed perpendicular and horizontally to the conveyance path for the sheet P. For the particle bearer 130, a technique of a developing roller for use in the electrophotographic type can be used.

A regulation blade 111 is disposed so as to be in contact with the outer peripheral face on the downstream side in the rotational direction of the particle bearer 130. The regulation blade 111 regulates the thickness of a particle layer borne on the outer peripheral face of the particle bearer 130 to a constant thickness.

A nozzle portion 121 is disposed at the bottom of the adhesive agent tank 120. A latent image is formed on the sheet P with the adhesive agent AD dropped from the nozzle portion 121 by inkjetting. That is, the adhesive agent tank 120 and the nozzle portion 121 are included in a latent image forming device. Here, a "latent image" refers to an image formed with some method so as to be invisible or difficult to see with a naked eye.

The particle bearer 130 of the particle tank 110 disposed downstream the adhesive agent tank 120 rotates in a close contact with the sheet P, so that the particles G adhere to the latent image formed with the adhesive agent AD on the sheet P and an uneven image with the particles G is formed. That is, the particle tank 110, the regulation blade 111, and the particle bearer 130 are included in a visualizing device for visualizing the latent image with the adhesive agent AD. Here, a "visualized image" refers to an image (shape) having unevenness, and is not necessarily limited to an image (shape) recognized visually. For example, even a colorless and transparent uneven shape is included in the "visualized image".

The particles G each having a spherical shape and a single diameter are used and a single particle layer is basically formed on the outer peripheral face of the particle bearer 130, so that charging of the particle layer can be made uniform. Further, a single particle is developed for a latent image of one dot to form a uniform dot particle image. As a result, achieved can be stabilization of image quality due to application of frequency modulation (FM) screening, cost reduction of color images due to arrangement of a plurality of colors without superimposition, and resource saving/miniaturization due to no cleaner. Even if a portion where two particle layers partially overlapping each other are formed on the outer peripheral face of the particle bearer 130, there is no significant influence on charging uniformity of such a particle layer or uniform-dot particle image formation. Note that the particles G are not limited to toner and can be developed to other application fields.

Formation of Multiple Particle Layers

Two sets of the particle tank 110 and the adhesive agent tank 120 can be disposed in series as illustrated in FIG. 1B. That is, two particle tanks 110 and two adhesive agent tanks 120 are alternately disposed from the upstream side along the conveyance path for the sheet P. This arrangement enables the particles to be stacked in two layers in the thickness direction on the sheet P. In order to stack three or more particle layers on the sheet P, the configuration of FIG. 1B can be further added by a desired number of layers such as three sets in series or four sets in series along the conveyance path for the sheet P. As a result, a plurality of layers can be formed in one pass by a high-speed machine. An intermediate transfer medium instead of the sheet P can be used to collectively transfer the multiple particle layers formed on the intermediate transfer medium onto the sheet P.

It is also possible to increase the number of layers of the large-diameter particles G to two or more by increasing the number of the particle tanks 110 and the adhesive agent tanks 120 disposed in series. Adoption of such a technique facilitates adjustment in the thickness direction, which is conventionally difficult to control.

As illustrated in FIG. 1C, use of an intermediate bearer 140 facilitates formation multiple layers of two or more layers. In FIG. 1B, direct coating of the adhesive agent AD onto the sheet P causes attraction of the large-diameter particles G. In order to form a plurality of large-diameter particle layers, an adhesive-agent application device (adhesive agent tank 120) and a large-diameter particle supply device (particle tank 110) corresponding to the number of layers are provided. Use of the intermediate bearer 140 facilitates formation of an optional number of large-diameter particle layers due to rotation of the intermediate bearer 140 by the number of layers.

The intermediate bearer 140 is larger in diameter than the particle bearer 130, and has a diameter of about twice to three times in the illustrated example. The rotation axis of the intermediate bearer 140 is disposed perpendicular and horizontally to the conveyance path for the sheet P.

The adhesive agent tank 120 is disposed directly above the intermediate bearer 140. The particle tank 110 is disposed closer to the downstream of the rotational direction of intermediate bearer 140 than the adhesive agent tank 120 is, and disposed substantially directly beside the intermediate bearer 140. The outer peripheral face of the particle bearer 130 exposed outside the particle tank 110 faces the outer peripheral face of the intermediate bearer 140.

Due to rotation of the intermediate bearer 140 in the arrow direction for a plurality of times (by the number of layers), the particles G supplied from the particle bearer 130 are repeatedly supplied to the same portion of the latent image with the adhesive agent AD on the outer peripheral face of the intermediate bearer 140. As a result, multiple particle layers of the optional number of two or more layers are formed on the outer peripheral face of the intermediate bearer 140. The multiple particle layers formed in such a manner can be collectively transferred onto the sheet P by bringing the outer peripheral face of the intermediate bearer 140 close to the sheet P.

FIG. 1C illustrates a columnar medium as the intermediate bearer 140. A belt type intermediate transfer medium, however, may be provided as the intermediate bearer 140. Further, the sheet P can be wound around the intermediate bearer 140 serving as a holder for the sheet P and a large-diameter particle layer can be directly formed on the sheet P.

Formation of Multiple Particle Layers by Reciprocation

Figure 2A:
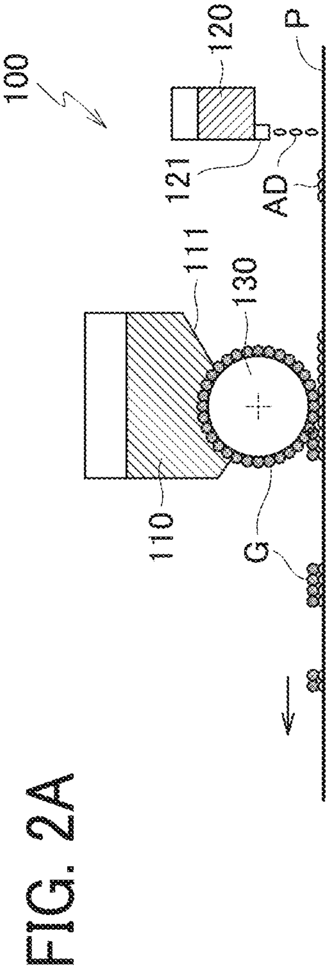
FIGS. 2A, 2B, and 2C illustrate a process of forming a plurality of particle layers on a sheet.
Figure 2B:
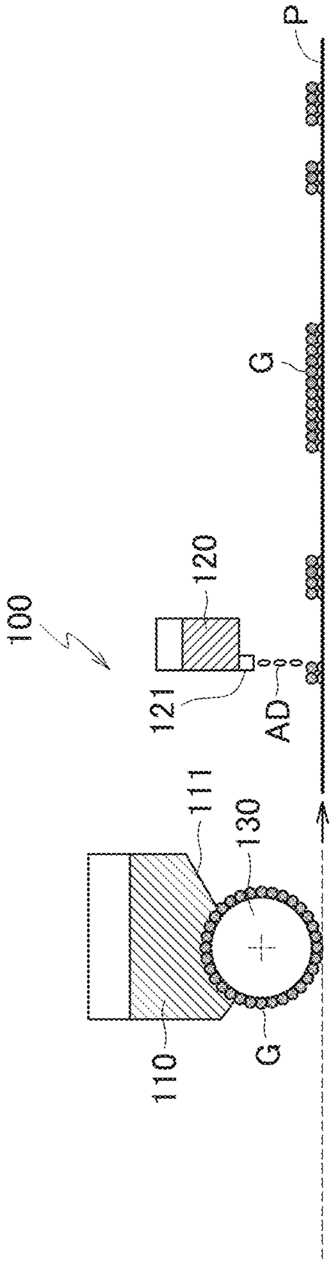
Figure 2C:
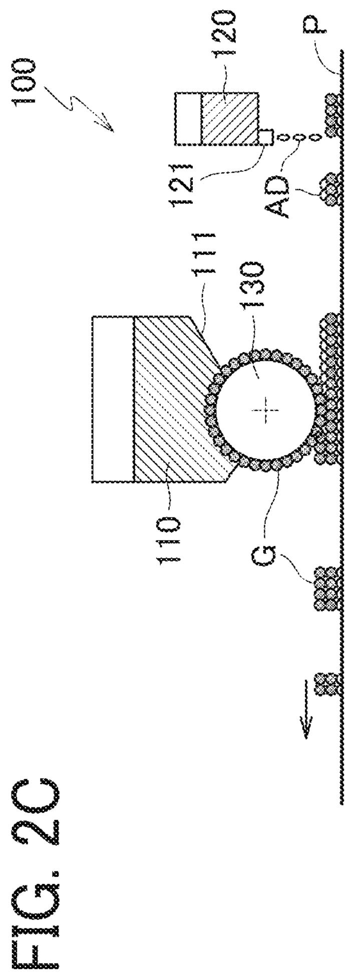

FIGS. 2A to 2C illustrate a process of forming multiple particle layers on a sheet P by reciprocating the sheet P. That is, a first particle layer is formed in the step of FIG. 2A as in FIG. 1A. As illustrated in FIG. 2B, the sheet P on which the first particle layer formed is retracted in the arrow direction and once returned to the original position.

As illustrated in FIG. 2C, the sheet P is advanced again in the arrow direction, and the adhesive agent is applied onto the first particle layer to form a second particle layer. Repetition of this step facilitates formation of multiple particle layers even having two or more layers.

Fixing Device

Figure 3:
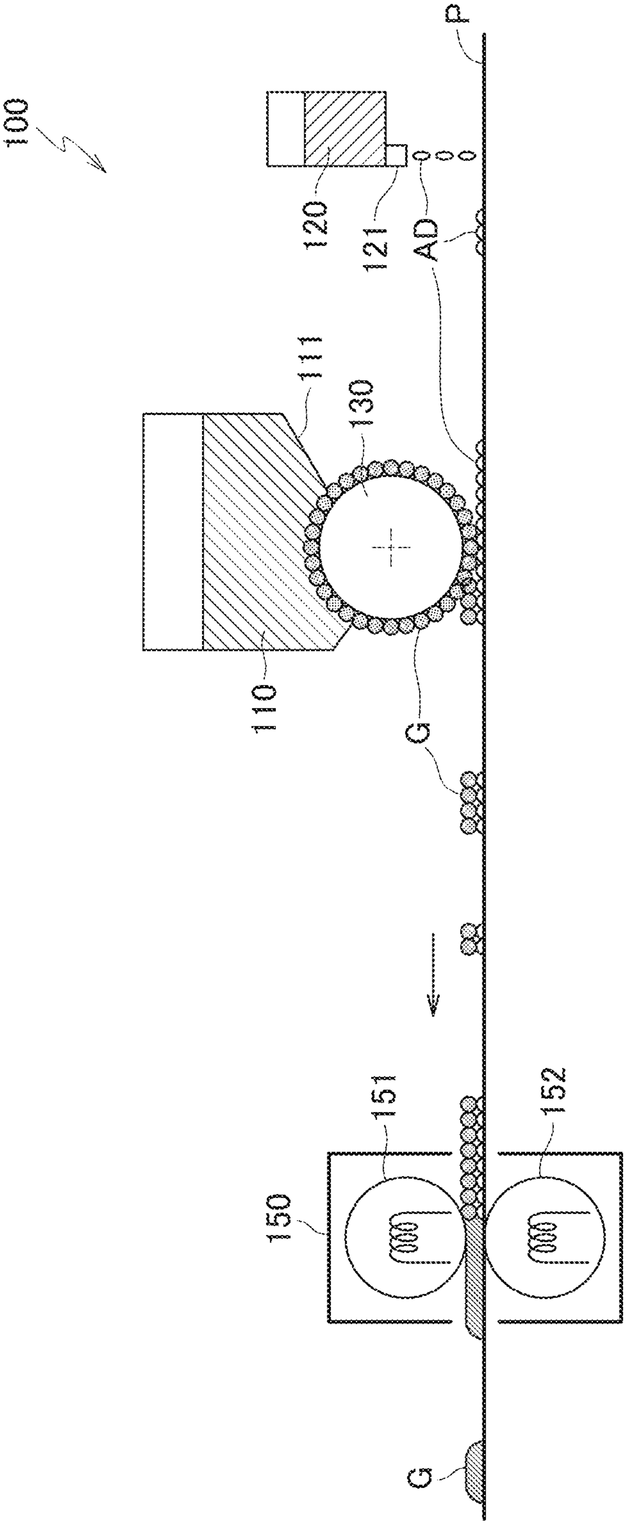
FIG. 3 illustrates a process of stabilizing a particle layer on the sheet.

FIG. 3 illustrates the image former 100 described with reference to FIGS. 1A to 2C to which a fixing device 150 is added. The large-diameter particle layer formed by the method of FIGS. 1A to 2C is in a state of being temporarily fixed on the sheet P by the adhesive agent AD. Therefore, in order to stabilize an uneven image with the large-diameter particle layer, the corresponding surface layers of the large-diameter particles G are melted by the heat of the fixing device 150.

The fixing device 150 includes a pair of upper and lower heating rolls 151 and 152 in each of which a heating source is incorporated, and passes the sheet P having the formed particle layer between the heating rolls 151 and 152. Solidification of the adhesive agent AD by the heat of the heating rolls 151 and 152 increases the bonding force between the particles and increases the bonding force of the particle layer to the sheet P.

As a result, the large-diameter particle layer with which the uneven image is formed can be firmly fixed onto the sheet P. In FIG. 3, the heating rolls 151 and 152 of the fixing device 150 sandwich the sheet P from above and below. Alternatively, a fixing device including a heating belt instead of the heating rolls 151 and 152 may be provided.

Adhesive Agent Containing Thermosetting Agent

Figure 4A:
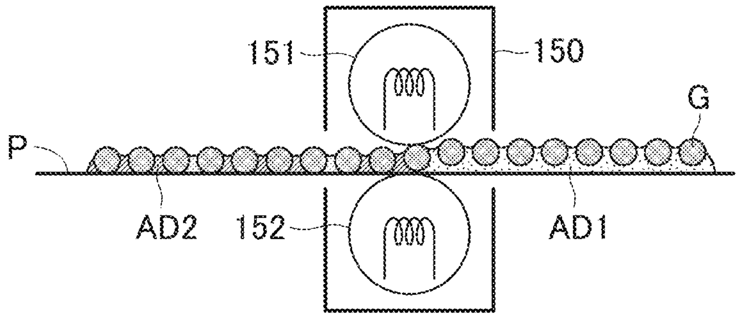
FIG. 4A illustrates a process of securing the particle layer on the sheet.

FIG. 4A illustrates the case of using an adhesive agent AD containing a thermosetting agent. That is, a thermosetting agent to be cured by heat of 100° C. or more is added to a liquid or a gel adhesive agent AD for attracting large-diameter particles G.

When the sheet P on which the large-diameter particles G are attracted passes the fixing device 150, the large-diameter particles G are pressurized on the sheet P and the thermosetting agent added to the adhesive agent AD is cured by heat. As a result, the adhesive agent AD cured by the heat is secured while containing the large-diameter particles G, so that the large-diameter particles G can be firmly fixed onto the sheet P.

Figure 4B:
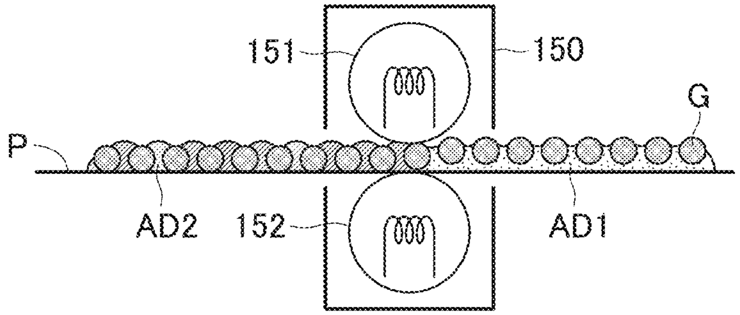
FIG. 4B illustrates a process of securing the particle layer on the sheet.

FIG. 4B illustrates the case where a foaming agent is also added to the adhesive agent AD in addition to the thermosetting agent. Basically, obtained can be the effect similar to effect of the adhesive agent AD to which the thermosetting agent is added in FIG. 4A. In FIG. 4B, the bonding force of particles to a sheet P can be further strengthened.

That is, when the large-diameter particles G pass the fixing device 150, the foaming agent foams in a state of the large-diameter particles G pressed against the sheet P by the heating roll 151, and the adhesive agent AD grows so as to cover the large-diameter particles G. As a result, the adhesive agent AD cured by the heat of the heating roll 151 does not solidify the large-diameter particles G on the contact face with the sheet P, but solidifies so as to contain the large-diameter particles G. Therefore, the large-diameter particles G are less likely to be detached from the sheet P in comparison with the case of FIG. 4A. Moreover, when trying to increase the height of an uneven image with a foamed toner, the height tends to vary due to the influence of the foaming ratio. The height of the uneven image, however, can be stabilized by using the large-diameter particles G as illustrated in FIG. 4A.

As the foaming agent, for example, used can be a foaming agent containing a substance that generates gas by thermal decomposition as a main raw material. Specifically, a bicarbonate such as sodium bicarbonate that generates carbon dioxide gas by thermal decomposition, a mixture of NaNO2 and NH4Cl that generates nitrogen gas, an azo compound such as azobisilovyronitrile or diazoaminobenzene, a peroxide that generates oxygen can be used.

A microcapsule-type foaming agent is preferable because of the high foaming properties. It is preferable that a low-boiling-point substance contained in the microcapsule be vaporized at least at a temperature lower than the heat fixing temperature. The low-boiling-point substance is specifically a substance that is vaporized at 100° C. or lower, preferably 50° C. or lower, and more preferably 25° C. or lower.

However, the thermal responsiveness of the microcapsule-type foaming agent depends not only on the boiling point of the low-boiling-point substance as the core material but also on the softening point of the wall material. Thus, the preferred boiling point range of the low-boiling-point substance is not limited to the above range. Examples of the low-boiling-point substance include neopentane, neohexane, isopentane, isobutylene, and isobutane. Among the examples, isobutane stable to the wall material of the microcapsule and having a high thermal expansion coefficient is preferable.

Configuration of Large-Diameter Particle

FIGS. 5A to 5D illustrate a plurality of configuration examples of such a large-diameter particle G as described above. A large-diameter particle G illustrated in FIG. 5A has a particle diameter several times to several hundred times (particle diameter of 20 μm or more) larger than the particle diameter of toner (particle diameter of 7 to 8 μm) used for the conventional electrophotography. When the particle diameter is too large, it is difficult to secure the particle to a sheet P and to make multiple large-diameter particle layers. Thus, the particle diameter is desirably 20 μm or more and 500 μm or less.

The large-diameter particle G basically has a two-layer structure of a central portion and an outer peripheral covering portion. That is, the center portion contains a heat-resistant particle Ga, and the outer periphery of the heat-resistant particle Ga is covered with a binder resin BR.

The heat-resistant particle Ga contains an insoluble substance hardly melted by heat when heat fixing is performed. The binder resin BR has a melting property of binding to a sheet P and the large-diameter particle G in the periphery by melting due to application of heat and pressure from the outside of the large-diameter particle G.

Therefore, it is desirable that the heat-resistant particle Ga and the binder resin BR be different in melting temperature by 10° C. or more. Further, as an example of the heat-resistant temperature of the heat-resistant particle Ga at that time, the heat-resistant temperature of the particle is desirably 120° C. or higher when the fixing temperature is 100° C.

Figure 5A:
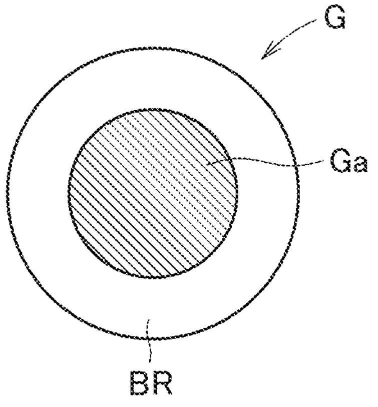
FIG. 5A illustrates the configuration of a particle.
Figure 5B:
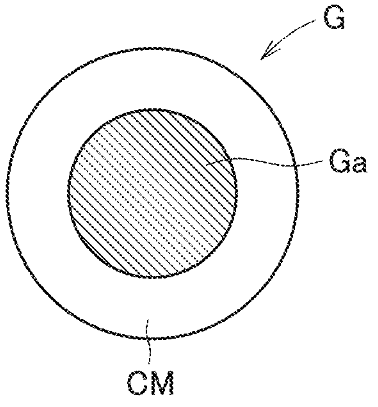
FIGS. 5BA and 5BB illustrate the configuration of a particle.
Figure 5B:
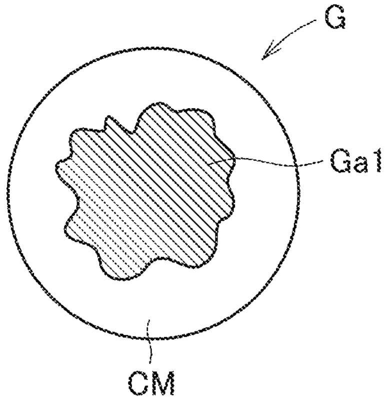

FIG. 5BA illustrates a large-diameter particle G containing a heat-resistant particle Gain the center portion similarly to the large-diameter particle G illustrated in FIG. 5A. The heat-resistant particle Ga has an outer peripheral covering portion having a coating layer CM mixed with a coloring material.

The coloring material containing a white pigment is added to the coating layer CM. As the white pigment, titanium dioxide, ultrafine titanium dioxide, zinc white, or lithopone can be used.

Due to the addition of the coloring material containing the white pigment to the coating layer CM, the color tone of the heat-resistant particle Ga in the central portion is less noticeable in appearance. Further, because the heat-resistant particle Ga has the surface having the coating layer CM, the shape of the heat-resistant particle Ga is not limited to be spherical and thus a heat-resistant particle Ga having an irregular shape can be used. Such a spherical heat-resistant particle Ga typically tends to be higher in cost than an irregular heat-resistant particle Ga. Thus, use of the irregular heat-resistant particle Ga can reduce the cost of uneven image formation.

The irregular shape may be, for example, an uneven shape as illustrated in FIG. 5BB. The irregular shape can bring an effect that the heat-resistant particle Ga is easily bound to the sheet P and the large-diameter particle G in the periphery.

Figure 5C:
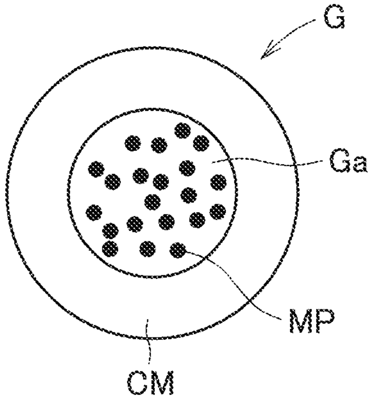
FIGS. 5CA and 5CB illustrate the configuration of a particle.
Figure 5C:
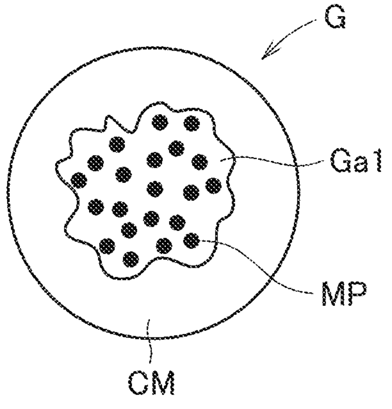

A large-diameter particle G in FIGS. 5CA and 5CB is basically the same as the large-diameter particle G in FIGS. 5BA and 5BB, but is different in that magnetic particles MP are added to the contained heat-resistant particle Ga. The addition of the magnetic particles MP in such a manner enables formation of an uneven image that reacts with a magnetic sensor or the like. As a result, for example, a recording medium on which an uneven image is formed can be easily classified, arranged, and searched by magnetism.

Figure 5D:
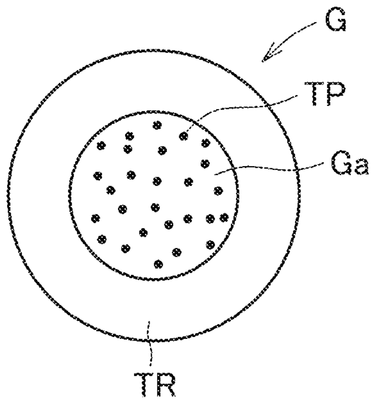
FIG. 5D illustrates the configuration of a particle.

A large-diameter particle G in FIG. 5D is basically the same as the large-diameter particle G in FIG. 5A, but is different in that the large-diameter particle G contains transparent heat-resistant particles TP and is covered with a transparent binder resin TR having a transparent surface. The use of the transparent binder resin TR in such a manner enables printing without affecting a planar image with an uneven image such as a Braille character formed as a lower layer.

Particle Bearer Having Magnetically Attractive Property

Figure 6:
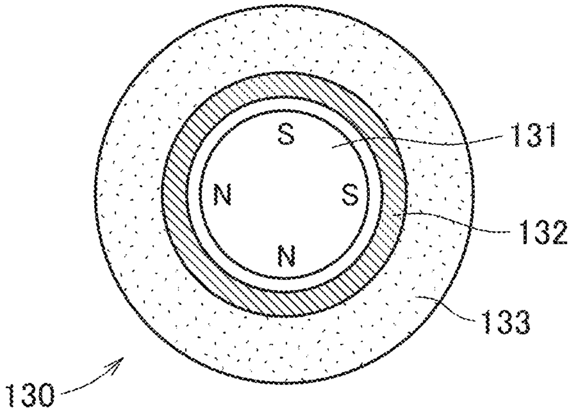
FIG. 6 is a cross-sectional view of a particle bearer.

FIG. 6 illustrates the configuration of the particle bearer 130 having a magnetically attractive property. The particle bearer 130 has a shaft 131 serving as the rotary shaft magnetized to the S pole and the N pole. The outer periphery of the magnetized shaft 131 is covered with a hollow sleeve 132. The outer periphery of the sleeve 132 is covered with a low-hardness rubber layer 133.

In order to form an uneven image with large-diameter particles G (particle diameter of 20 to 100 μm) much larger than the particle diameter of the conventional toner (particle diameter of 5 to 13 μm), the particle bearer 130 having a surface roughness Rz of about several μm is difficult to reliably bear the large-diameter particles G on the surface of the particle bearer 130 and reliably supply the large-diameter particles G to the surface of an adhesive agent AD. Therefore, as illustrated in FIG. 5CA, the magnetic particles MP are added to the heat-resistant particles Ga and the particle bearer 130 is made to have a magnetically attracting property.

As the low-hardness rubber layer 133, a low-hardness rubber having a hardness of 40 or less in terms of rubber hardness JIS-A can be used. In order to decrease the rubber hardness of the low-hardness rubber layer 133, a similar effect can be expected even if foamed rubber or foamed rubber with a surface layer is used instead of solid rubber.

Note that use of a low-hardness rubber layer having a lower hardness, foamed rubber without a surface layer, or a brush roller for the surface of the particle bearer 130 can enhance the surface bearing property of the particle bearer 130. As a result, without magnetic attraction, such large-diameter particles G not containing the magnetic particles MP as illustrated in FIGS. 5A and 5BA can be reliably borne on the surface of the particle bearer 130 and can be supplied to the surface of the adhesive agent AD.

Addition of Release Agent to Adhesive Agent

Figure 7:
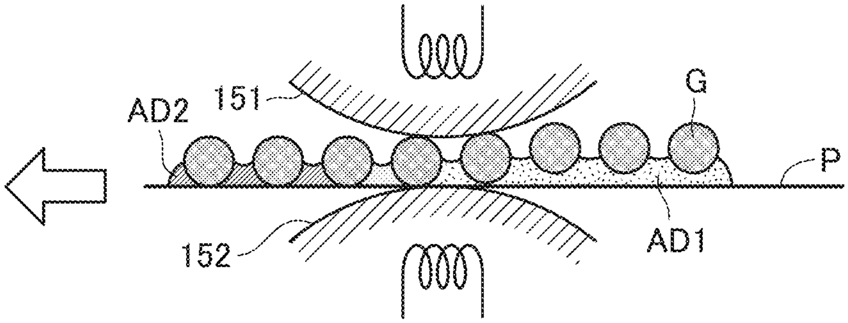
FIG. 7 illustrates a coated state of a release agent.

FIG. 7 illustrates that large-diameter particles G are secured with an adhesive agent AD1 to which a release agent is added. The addition of the release agent prevents adhesion of the large-diameter particles G or the adhesive agent AD1 to the upper heating roll 151 at the time of fixing by heat of the fixing device 150.

This release agent has a property of collecting on the surface layer of an adhesive agent when the adhesive agent is applied onto a sheet P. The release agent collected on the surface layer of the adhesive agent AD1 can prevent adhesion of the adhesive agent AD1 to the heating roll 151.

Part of the release agent is volatilized by the heat of the fixing device 150. The volatilized release agent adheres to the outer peripheral face of the heating roll 151 to form a thin film of the release agent. The thin film of the release agent can prevent adhesion of the large-diameter particles G and the adhesive agent AD1 to the outer peripheral face of the heating roll 151. The adhesive agent AD1 becomes an adhesive agent AD2 solidified after passing the heating roll 151, and secures the large-diameter particles G to the sheet P.

Nozzle Portion for Adhesive Agent

Figure 8A:
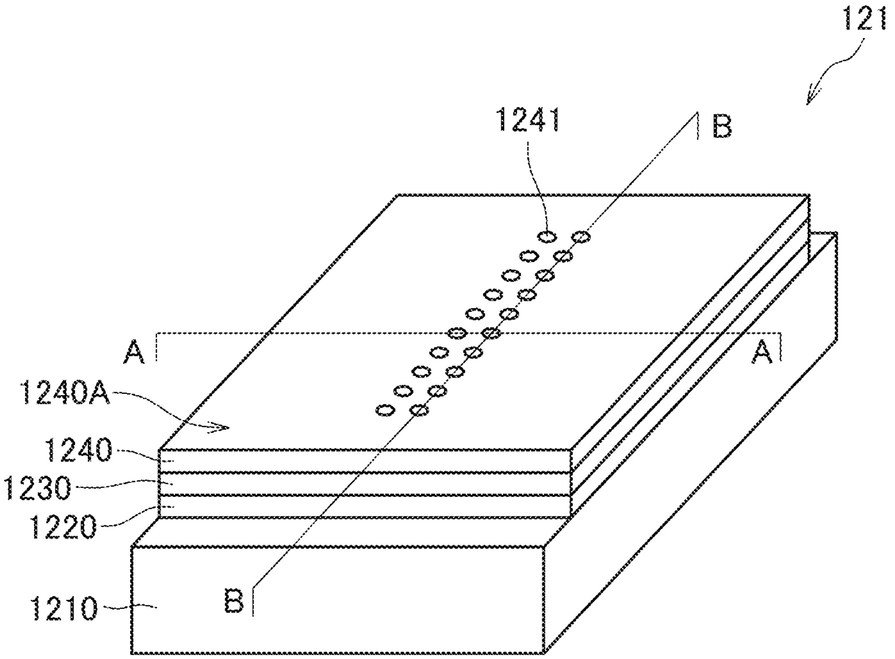
FIG. 8A is a schematic view of a nozzle portion.
Figure 8B:
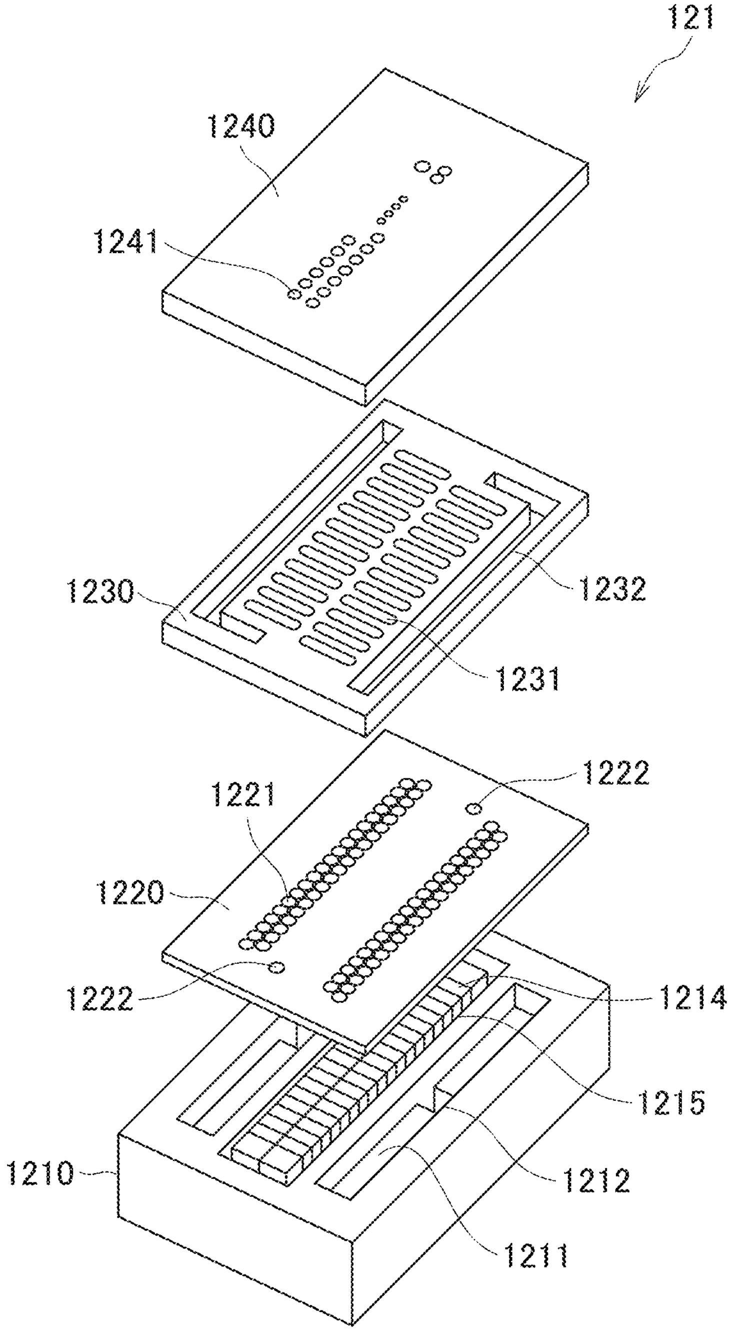
FIG. 8B is an exploded perspective view of the nozzle portion.
Figure 8C:
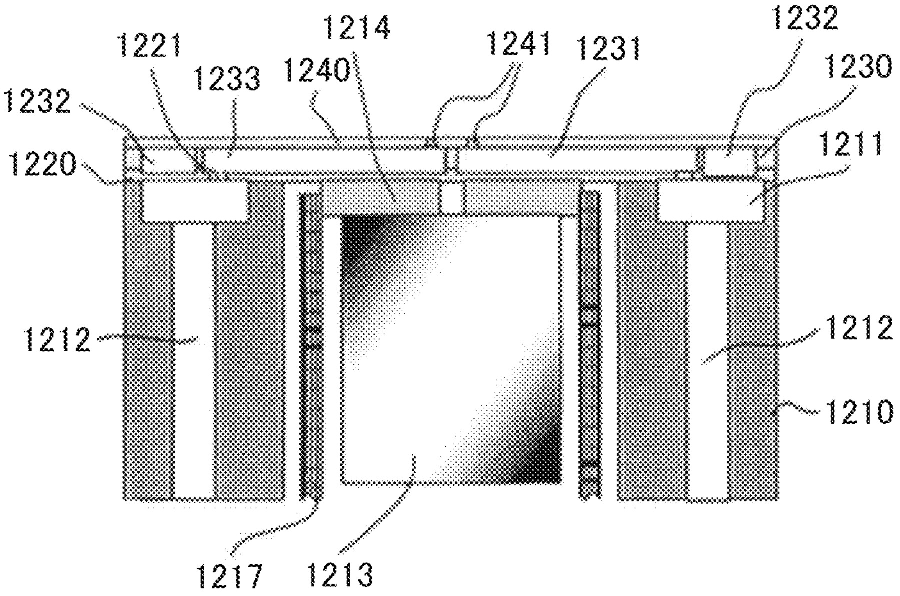
FIG. 8C is a cross-sectional view taken along line A-A of FIG. 8A.
Figure 8D:
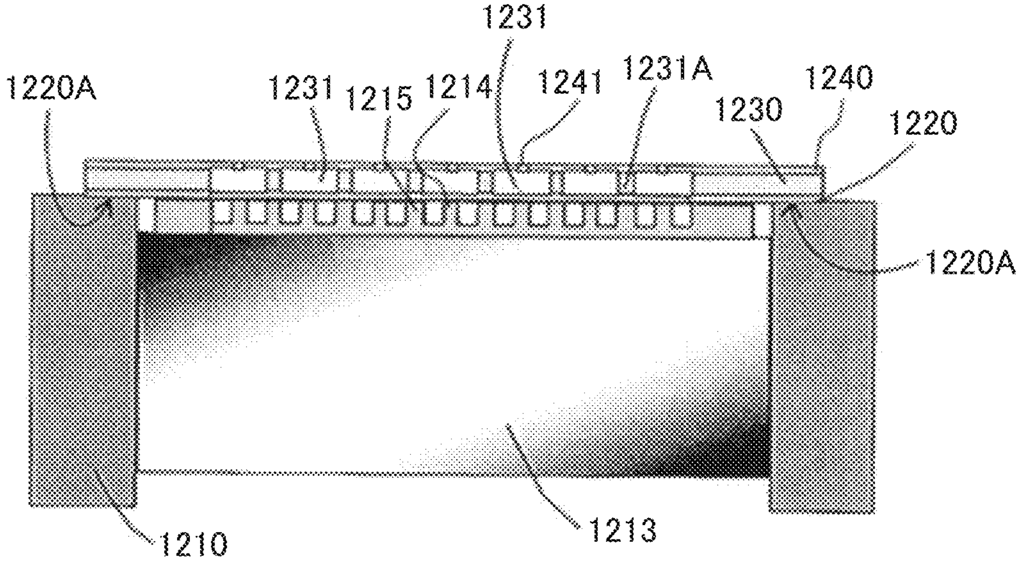
FIG. 8D is a cross-sectional view taken along line B-B of FIG. 8A.

FIG. 8A is a perspective view of an exemplary discharge head used for the nozzle portion 121 at the bottom of the adhesive agent tank 120. FIG. 8B is an exploded perspective view of the discharge head. FIG. 8C is a cross-sectional view taken along line A-A of the discharge head of FIG. 8A. FIG. 8D is a cross-sectional view taken along line B-B of the discharge head of FIG. 8A. For this discharge head, an inkjet discharge system corresponding to application of a high-viscosity liquid can be used.

The discharge head includes a frame member 1210, a vibration plate 1220, a path plate 1230 (i.e., a flow-path forming member including a pressurized liquid chamber), and a nozzle plate 1240 (i.e., a flow-path forming member having a nozzle hole) are layered and joined in this order. The frame member 1210 is formed by, for example, injection molding of epoxy-based resin or polyphenylene sulfite.

The frame member 1210 is joined to a base substrate 1213 formed of a high-rigidity material such as metal or ceramics. On the base substrate 1213, formed is a piezoelectric element 1214 (layered piezoelectric element, electromechanical transfer element) serving as a pressure generator for pressurizing liquid (e.g., ink) in a pressurized liquid chamber 1231 that the path plate 1230 is provided with. Inside the frame member 1210, formed are a recess to be a common liquid chamber 1211 communicating with the pressurized liquid chamber 1231 and an ink supply hole 1212 for supplying ink to the common liquid chamber 1211 from the outside.

The piezoelectric element 1214 includes piezoelectric layers of lead zirconate titanate (PZT) having a thickness of 10 to 50 μm/l layer and internal electrode layers of silver/palladium (AgPd) having a thickness of several μm/l layer layered alternately. The internal electrodes are alternately electrically connected to an individual electrode and a common electrode as end face electrodes (external electrodes) on the end face, and a drive signal is supplied to these electrodes through a flexible flat cable (FPC) 1217.

The piezoelectric element 1214 has one face joined to the base substrate 1213 and the other face joined to the vibration plate 1220. When the piezoelectric element 1214 is recharged due to application of a drive signal, the piezoelectric element 1214 extends. When the charges recharged in the piezoelectric element 1214 is discharged, the piezoelectric element 1214 contracts in the opposite direction. The vibration plate 1220 curves due to this extension and contraction of the piezoelectric element 1214, so that the corresponding pressurized liquid chamber 1231 is contracted and expanded.

A support column portion 1215 is provided between such piezoelectric elements 1214 as described above, corresponding to a partition wall 1231A between such pressurized liquid chambers 1231 as described above. Here, a piezoelectric element member is slit by half-cut dicing to be divided into comb teeth, and each piezoelectric element 1214 and each support column portion 1215 are formed. The support column portion 1215 is the same in configuration as the piezoelectric element 1214. The support column portion 1215, however, simply functions as a support column because no drive voltage is applied.

The vibration plate 1220 has an outer peripheral portion 1220A bonded to the frame member 1210 with an adhesive. The vibration plate 1220 includes an ink supply port 1221 that communicates with the pressurized liquid chamber 1231 and supplies ink from the common liquid chamber 1211 of the frame member 1210 to the corresponding pressurized liquid chamber 1231. The vibration plate 1220 is formed in, for example, a metal plate shape of nickel having a three-layer structure, and is fabricated by, for example, electroforming. However, a different metal plate or resin plate, a layered member of a metal and a resin plate, or a layered member of a metal and another metal can also be used.

The path plate 1230 is formed by molding a stainless steel material into a plate shape. The pressurized liquid chamber 1231 and an ink supply path 1233 are formed by a pressing method. A damper chamber 1232 is formed shallower than the pressurized liquid chamber 1231 resulting from half etching by a wet etching method. Alternatively, for example, used can be a path plate in which a path pattern such as a pressurized liquid chamber 1231 is formed by anisotropically etching a single crystal silicon substrate having the crystal plane orientation (110) (not limited to single crystal silicon) with an alkaline etching solution such as an aqueous potassium hydroxide solution (KOH).

The damper chamber 1232 forms a rectangular space with the nozzle plate 1240 and the vibration plate 1220, and communicates with the atmosphere through an atmosphere communication pipe 1222 provided in the vibration plate 1220 to have an air damper effect.

The nozzle plate 1240 has a nozzle hole 1241 corresponding to each pressurized liquid chamber 1231. Hereinafter, the nozzle plate 1240 will be described in detail.

The nozzle hole 1241 is formed in the nozzle plate 1240 by pressing and polishing. The nozzle plate 1240 is formed of, for example, a stainless steel material (SUS) in a plate shape.

Use of such a SUS-based metal member for the nozzle plate 1240 enables coping with various liquids and forming a nozzle plate that enables reduction of a material cost and support of an elongate shape. Note that the material of the nozzle plate 1240 is not limited to stainless steel and thus other metal materials may be used.

The inner shape of the nozzle hole 1241 is straight, tapered, or straight-tapered in combination of the two shapes. The hole diameter of the nozzle hole 1241 is, for example, about 10 to 35 μm in diameter on the ink-droplet outlet side, and the nozzle pitch of each row is 150 dpi.

A water-repellent treatment layer subjected to a water-repellent surface treatment is provided on a nozzle face 1240A (a liquid discharge face as an outer face in the discharge direction) of the nozzle plate 1240. The water-repellent treatment layer is formed by a treatment selected in accordance with the physical properties of ink from, for example, polytetrafluoroethylene (PTFE)-Ni eutectoid plating, electrodeposition of fluororesin, vapor deposition coating of evaporative fluororesin (e.g., fluorinated pitch), firing after coating of a solution of silicon-based resin or fluorine-based resin. Due to the provision of the water-repellent treatment layer, the shape and flying properties of ink droplet are stabilized to provide high-quality images.

Application of Coating Agent

Figure 9:
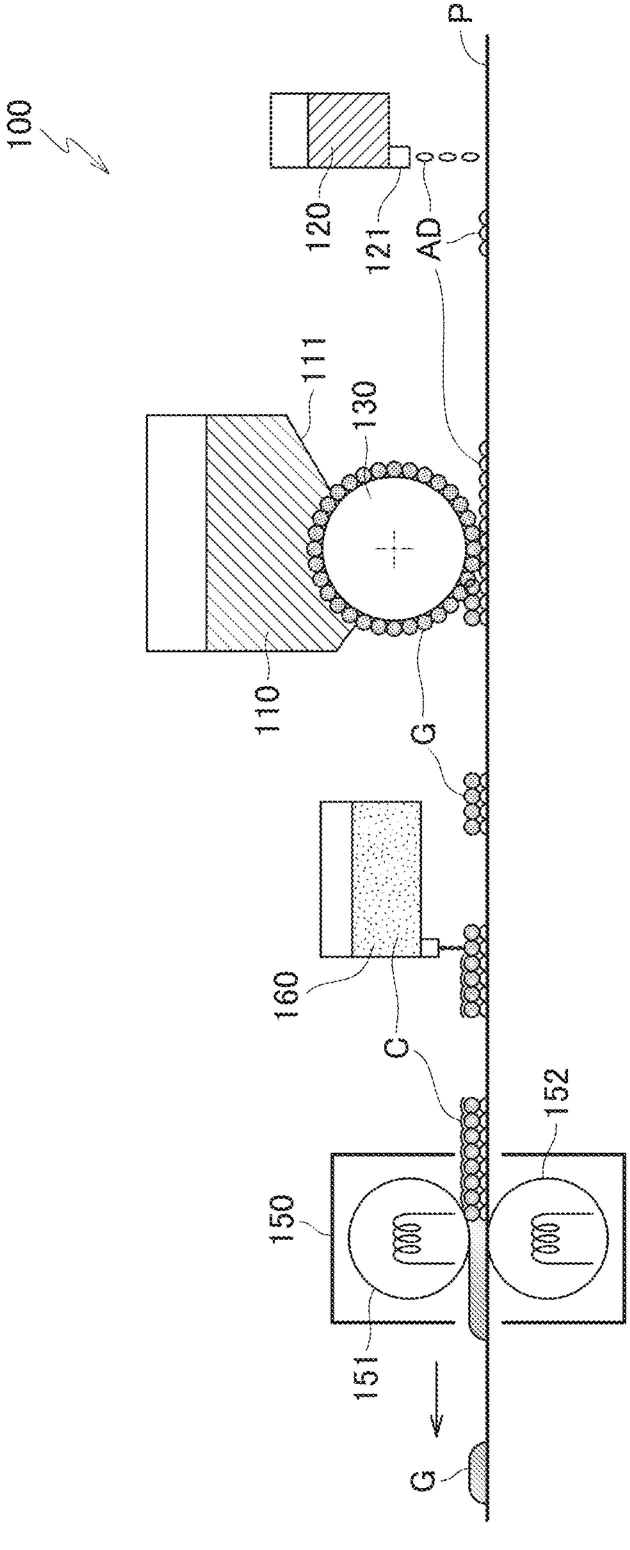
FIG. 9 illustrates a coated state of a coating agent.

FIG. 9 illustrates an uneven-image former 100 that a coating agent is applied onto particles in order to stabilize the particles after the particles area visualized on a sheet P. That is, a coating-agent application device for applying a coating agent onto the surface of a large-diameter particle layer is provided between the large-diameter-particle supply device and the fixing device.

This coating-agent application device is basically achievable with an application system corresponding to the inkjet system. Alternatively, spraying in a vaporized state like a diffuser is applicable. An adhesive for securing the large-diameter particles G to an image forming medium and a release agent for improving releasability from a fixing roller of the fixing device are also added to the coating agent.

Ultraviolet (UV) Fixing device

Figure 10:
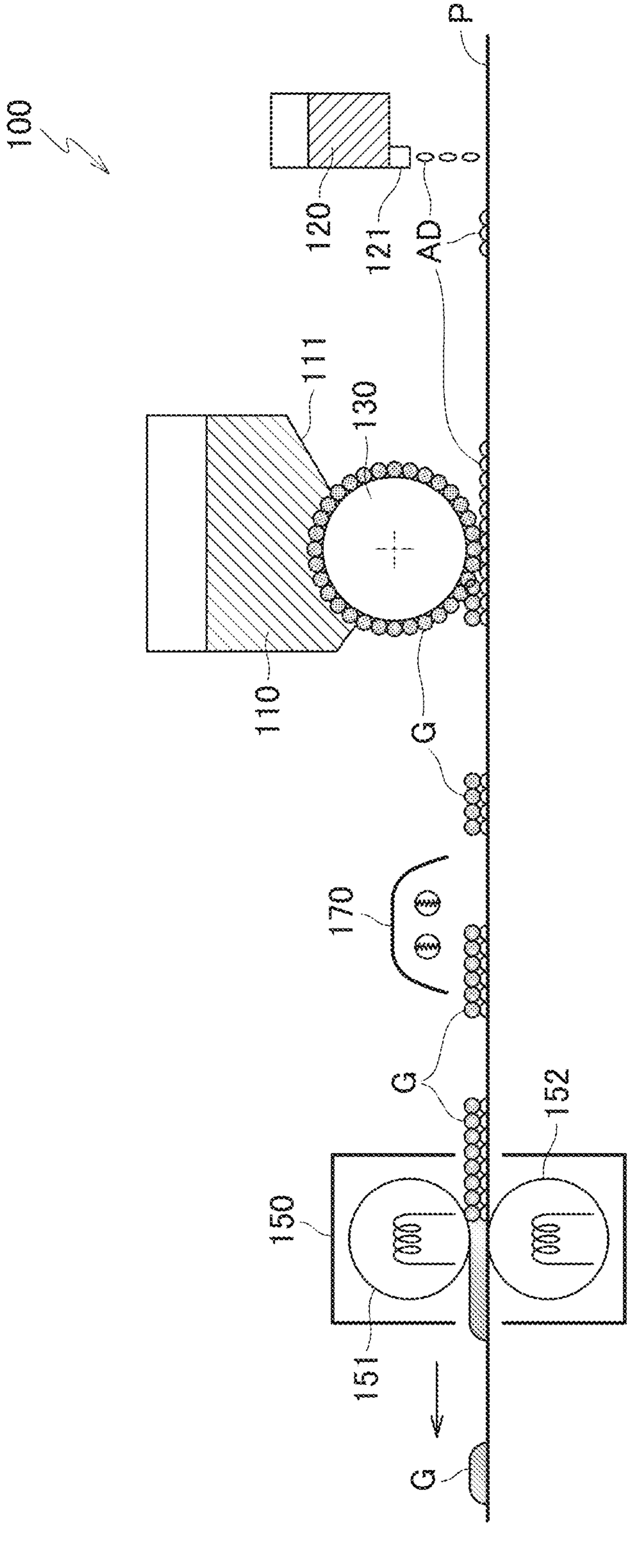
FIG. 10 is a schematic configuration view of an image former including an ultraviolet (UV) fixing device.

FIG. 10 illustrates the uneven-image former of FIG. 9 to which a UV fixing device 170 serving as a UV light irradiator is added between the particle tank 110 and the fixing device 150. A UV-curable agent is added in advance to an adhesive agent AD in the adhesive agent tank 120. The UV-curable agent contains a resin component that is cured by UV light.

Before the sheet P on which an uneven image is formed enters the fixing device 150, the UV fixing device 170 irradiates the uneven image with UV light. As a result, the adhesive agent AD covering the large-diameter particles G on the uneven image is cured, resulting in prevention of detachment of the large-diameter particles G.

In a case where a planar image is not necessary or a planar image is formed with ink to which a UV-curable resin is added, the fixing device 150 is not provided and both the uneven image with the large-diameter particles G and the planar image can be fixed by the UV fixing device 170. This arrangement enables significant power reduction in comparison with the fixing device.

Electrophotographic Image Forming Device

Figure 11A:
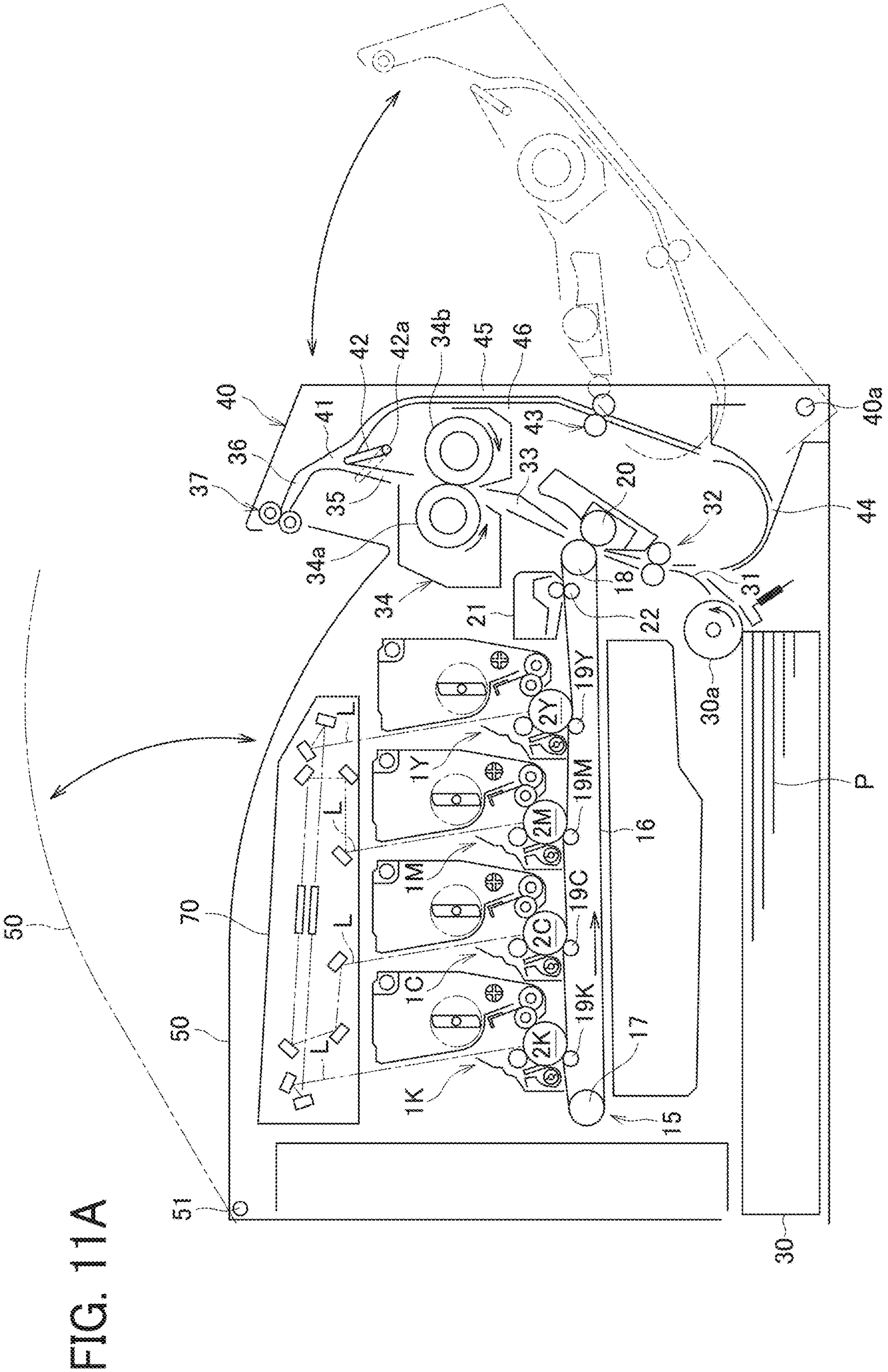
FIG. 11A is a schematic configuration view of an electrophotographic image forming device.
Figure 11B:
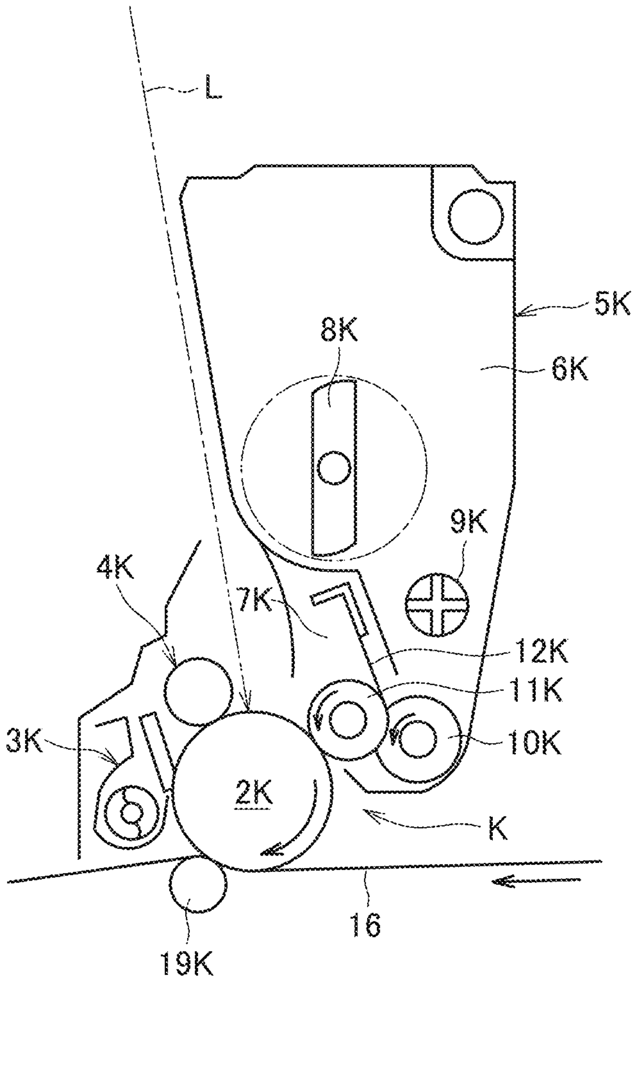
FIG. 11B is an enlarged configuration view of a process unit.
Figure 11C:
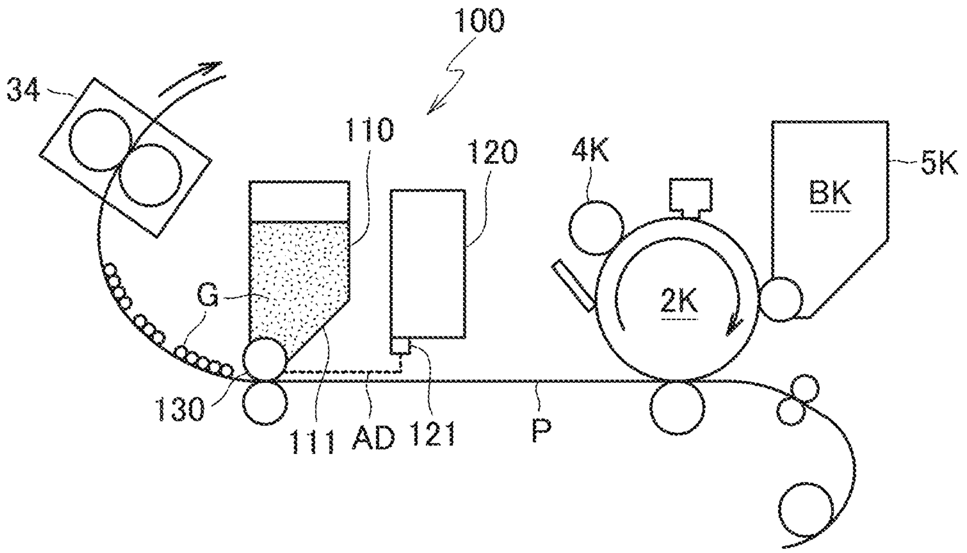
FIG. 11C is a schematic configuration view of a hybrid image forming apparatus in which the image former of FIG. 1A is incorporated in an electrophotographic image forming device.

The above image former 100 can be a hybrid type as illustrated in FIG. 11C described later in combination with a conventional electrophotographic image forming device. The electrophotographic image forming device may be a monochrome printer or a color printer including a multifunction peripheral (MFP).

The conventional electrophotographic image forming device will be described below with reference to FIGS. 11A and 11B. FIG. 11A is a schematic configuration view of a printer serving as the electrophotographic image forming device. FIG. JI B is an enlarged configuration view of a process unit for K of the printer.

The printer includes four process units 1Y, 1M, 1C, and 1K for forming toner images of yellow, magenta, cyan, and black (hereinafter, referred to as Y, M, C, and K, respectively). The process units 1Y, 1M, 1C, and 1K use, respectively. Y, M, C, and K toners different in color as an image forming substance, but are similar in configuration except the toners. The process units 1Y, 1M, 1C, and 1K are each replaced at the end of the service life.

As illustrated in FIG. 11B, the exemplary process unit 1K for forming a K toner image includes a drum-shaped photoconductor 2K serving as a latent image bearer, a drum cleaning device 3K, a static eliminator, a charging device 4K, and a developing device 5K. The process unit 1K serving as an image forming unit is detachably attachable to the main body of the printer, and the consumable parts of the process unit 1K can be replaced at one time.

The charging device 4K uniformly charges the surface of the photoconductor 2K rotated clockwise in the figure by a driving device. The surface of the photoconductor 2K charged uniformly is exposed and scanned with laser light L so as to bear an electrostatic static latent image for K.

The electrostatic latent image for K is developed into a K toner image by the developing device 5K with K toner. Then, the toner image is primarily transferred onto an intermediate transfer belt 16. The drum cleaning device 3K removes transfer residual toner adhering on the surface of the photoconductor 2K after the primary transfer process.

The static eliminator eliminates residual charges of the photoconductor 2K after the cleaning. Due to this elimination, the surface of the photoconductor 2K is initialized, so that the photoconductor 2K prepares for a subsequent image formation. With each process unit (1Y, 1M, or 1C) different in color, a toner image (Y, M, or C) is similarly formed on the corresponding photoconductor (2Y, 2M, or 2C) and is intermediately transferred onto the intermediate transfer belt 16 described later.

The photoconductor 2K has a cylindrical drum portion with the front surface of a hollow aluminum element tube covered with an organic photoconductive layer. The drum portion of the photoconductor 2K has one end and the other end in the axial direction of the drum portion. A flange having a drum shaft is attached to each of the one end and the other end.

The developing device 5K serving as a developing device includes a vertically-long hopper portion 6K storing K toner and a developing portion 7K. In the hopper portion 6K, disposed are an agitator 8K rotationally driven by a driving device, a stirring paddle 9K rotationally driven by a driving device vertically below the agitator 8K, a toner supply roller 10K rotationally driven by a driving device in the vertical direction of the stirring paddle 9K, and others.

The K toner in the hopper portion 6K moves toward the toner supply roller 10K due to the own weight of the K toner while being stirred by the rotational drive of the agitator 8K and the stirring paddle 9K. The toner supply roller 10K includes a metal core and a roller portion made of a foamed resin or the like covering the surface of the core metal, and rotates while causing the K toner in the hopper portion 6K to adhere to the surface of the roller portion.

In the developing portion 7K of the developing device 5K, disposed are a developing roller 11K that rotates while being in contact with the photoconductor 2K and the toner supply roller 10K, a thinning blade 12K that brings the leading end of the thinning blade 12K into contact with the surface of the developing roller 11K, and others. The K toner adhered to the toner supply roller 10K in the hopper portion 6K is supplied to the surface of the developing roller 11K at the contact portion between the developing roller 11K and the toner supply roller 10K.

When passing the contact position between the roller and the thinning blade 12K along with the rotation of the developing roller 11K, the layer thickness of the supplied K toner on the surface of the roller is regulated. Then, the K toner after the regulation of the layer thickness adheres to an electrostatic latent image for K on the surface of the photoconductor 2K in a development region as the contact portion between the developing roller 11K and the photoconductor 2K. As a result, the electrostatic latent image for K is developed to a K toner image.

The process unit for K has been described with reference to FIG. 11B. At the process units 1Y, 1M, and 1C for Y, M, and C, a Y toner image, an M toner image, and a C toner image are, respectively, formed on the surface of the photoconductor 2Y, the surface of the photoconductor 2M, and the surface of the photoconductor 2C by a similar process.

In FIG. 11A illustrated above, an optical writing unit 70 is disposed vertically above the process units 1Y, 1M, 1C, and 1K. The optical writing unit 70 serving as a latent-image writing device optically scans the photoconductors 2Y, 2M, 2C, and 2K of the process units 1Y, 1M, 1C, and 1K with laser light L emitted from a laser diode on the basis of image information.

This optical scanning results in formation of respective electrostatic latent images for Y, M, C, and K on the photoconductors 2Y, 2M, 2C, and 2K. In such a configuration, the optical writing unit 70 and the process units 1Y, 1M, 1C, and 1K function as an image formation device that forms Y. M, C, and K toner images as visible images different in color on three or more latent image bearers.

Note that the optical writing unit 70 irradiates a photoconductor with the laser light (L) emitted from a light source through a plurality of optical lenses and mirrors while polarizing the laser light (L) in the main scanning direction with a polygon mirror rotationally driven by a polygon motor. Adopted can be a device that including a lightemitting diode (LED) array having a plurality of LEDs that emits LED light to perform optically writing with the LED light.

A transfer unit 15 that endlessly moves the endless intermediate transfer belt 16 counterclockwise while suspending the intermediate transfer belt 16 is disposed vertically below the process units 1Y, 1M, 1C, and 1K. In addition to the intermediate transfer belt 16, the transfer unit 15 serving as a transfer device includes a driving roller 17, a driven roller 18, four primary transfer rollers 19Y, 19M, 19C, and 19K, a secondary transfer roller 20, a belt cleaning device 21, a cleaning backup roller 22.

The intermediate transfer belt 16 is stretched over the driving roller 17, the driven roller 18, the cleaning backup roller 22, and the four primary transfer rollers 19Y, 19M, 19C, and 19K disposed inside the loop. Due to the rotational force of the driving roller 17 rotationally driven counterclockwise in the figure by a driving device, the intermediate transfer belt 16 is endlessly moved in the same direction.

The intermediate transfer belt 16 endlessly moved in such a manner is sandwiched between the four primary transfer rollers 19Y, 19M, 19C, and 19K and the photoconductors 2Y, 2M, 2C, and 2K. As a result, respective primary transfer nips for Y, M, C, and K at which the front face of the intermediate transfer belt 16 contacts with the photoconductors 2Y, 2M, 2C, and 2K are formed.

A primary transfer bias is applied to each of the primary transfer rollers 19Y, 19M, 19C, and 19K by a transfer bias power supply. Due to the application, a transfer electric field is formed between the electrostatic latent images of the photoconductors 2Y, 2M, 2C, and 2K and the primary transfer rollers 19Y, 19M, 19C, and 19K. Note that instead of the primary transfer rollers 19Y, 19M, 19C, and 19K, a transfer charger, a transfer brush, or the like may be adopted.

When the Y toner formed on the surface of the photoconductor 2Y of the process unit 1Y for Y enters the above primary transfer nip for Y with the rotation of the photoconductor 2Y, the Y toner is primarily transferred from the photoconductor 2Y onto the intermediate transfer belt 16 due to the action of the transfer electric field and the nip pressure. When the intermediate transfer belt 16 on which the Y toner image is primarily transferred passes through the primary transfer nips for M, C, and K along with the endless movement of the intermediate transfer belt 16, the M, C, and K toner images on the photoconductors 2M, 2C, and 2K are sequentially superimposed and primarily transferred onto the Y toner image. As a result, four color toner images are formed on the intermediate transfer belt 16.

The secondary transfer roller 20 of the transfer unit 15 is disposed outside the loop of the intermediate transfer belt 16, and the intermediate transfer belt 16 is sandwiched between the secondary transfer roller 20 and the driven roller 18 inside the loop. As a result, a secondary transfer nip at which the front face of the intermediate transfer belt 16 and the secondary transfer roller 20 contact with each other is formed.

A secondary transfer bias is applied to the secondary transfer roller 20 by a transfer bias power supply. Due to the application, a secondary transfer electric field is formed between the secondary transfer roller 20 and the driven roller connected to the ground.

Vertically below the transfer unit 15, a sheet feeding cassette 30 accommodating a plurality of recording sheets P in a sheet bundle state is disposed slidably attachably detachable from the housing of the printer. The sheet feeding cassette 30 includes a sheet feeding roller 30*a* in contact with the uppermost recording sheet P of the sheet bundle, and rotates the sheet feeding roller 30*a* counterclockwise in the figure at a predetermined timing to send the recording sheet P toward a sheet feeding path 31.

A pair of registration rollers 32 is disposed near the end of the sheet feeding path 31. The pair of registration rollers 32 stops the rotation of both rollers immediately after sandwiching, between the rollers, the recording sheet P sent from the sheet feeding cassette 30. Then, the rotation drive is resumed at a timing at which the sandwiched recording sheet P can be synchronized with the four color toner images on the intermediate transfer belt 16 at the secondary transfer nip, and the recording sheet P is sent toward the secondary transfer nip.

The four color toner images on the intermediate transfer belt 16 brought into close contact with the recording sheet P at the secondary transfer nip is collectively secondarily transferred onto the recording sheet P under the influence of the secondary transfer electric field and the nip pressure, and become a full-color toner image together with the white color of the recording sheet P. When the recording sheet P with the full-color toner image formed on the surface in such a manner passes through the secondary transfer nip, the recording sheet P is curvature-separated from the secondary transfer roller 20 and the intermediate transfer belt 16. Then, the recording sheet P is sent to a fixing device 34 described later through a post-transfer conveyance path 33.

The transfer residual toner that has not been transferred onto the recording sheet P adheres to the intermediate transfer belt 16 after passing the secondary transfer nip. The transfer residual toner is cleaned from the surface of the intermediate transfer belt 16 by the belt cleaning device 21 in contact with the front face of the intermediate transfer belt 16. The cleaning backup roller 22 disposed inside the loop of the intermediate transfer belt 16 backs up, from the inside of the loop, the belt cleaning device 21 to clean the intermediate transfer belt 16.

The fixing device 34 forms a fixing nip between a fixing roller 34*a* including a heat source such as a halogen lamp and a pressure roller 34*b* that rotates while being in contact with the fixing roller 34*a* at a predetermined pressure. The recording sheet P sent into the fixing device 34 is held by the fixing nip such that the unfixed-toner-image bearing face is brought into close contact with the fixing roller 34*a*. Then, the toner in the unfixed toner image melts due to application of the heat and the pressure, so that a full-color toner image is fixed onto the recording sheet P.

The recording sheet P ejected from the fixing device 34 passes the post-fixing conveyance path 35 and then reaches the branch point between a sheet ejection path 36 and a pre-reverse conveyance path 41. On the side of the post-fixing conveyance path 35, a switching claw 42 rotationally driven about a pivot 42*a* is disposed, and the vicinity of the end of the post-fixing conveyance path 35 is closed or opened by the pivoting.

At the timing at which the recording sheet P is sent from the fixing device 34, the switching claw 42 stops at the pivotal position indicated by the solid line in the figure, and the vicinity of the end of the post-fixing conveyance path 35 is opened. Thus, the recording sheet P enters the sheet ejection path 36 from the post-fixing conveyance path 35 and is sandwiched between a pair of sheet ejection rollers 37.

In a case where the single-sided print mode is set by, for example, an input operation to an operation device including a numeric keypad or a control signal sent from a personal computer, the recording sheet P sandwiched between the pair of sheet ejection rollers 37 is ejected outside the printer as the recording sheet P is. Then, the ejected recording sheet P is stacked on a stack portion as the upper face of an upper cover 50 of the housing.

On the other hand, in a case where the duplex print mode is set, when the rear end side of the recording sheet P conveyed in the sheet ejection path 36 while the front end side is sandwiched between the pair of sheet ejection rollers 37 passes the post-fixing conveyance path 35, the switching claw 42 rotates to the position of the one-dot chain line in the figure and the vicinity of the end of the post-fixing conveyance path 35 is closed. At substantially the same time, the pair of sheet ejection rollers 37 starts reverse rotation. Then, the recording sheet P is conveyed while the rear end side is directed to the head, and enters the pre-reverse conveyance path 41.

A right end portion of the printer in FIG. 11A serves as a reversing unit 40 that can be opened and closed with respect to the housing body by pivoting about a pivot 40*a*. When the pairs of sheet ejection rollers 37 rotates reversely, the recording sheet P enters the pre-reverse conveyance path 41 of the reversing unit 40 and is conveyed vertically from the upper side to the lower side.

Then, after passing between a pair of reverse conveyance rollers 43, the recording sheet P enters a reverse conveyance path 44 curved semicircularly. Further, while the upper and lower faces are reversed along with the conveyance along the curved shape, the traveling direction from the vertically upper side to the vertically lower side is reversed and the recording sheet P is conveyed vertically from the lower side to the upper side.

After the conveyance, the recording sheet P reenters the secondary transfer nip through the above sheet feeding path 31. Then, after the full-color image is collectively secondarily transferred onto the other face, the recording sheet P sequentially passes the post-transfer conveyance path 33, the fixing device 34, the post-fixing conveyance path 35, the sheet ejection path 36, and the pair of sheet ejection rollers 37. The recording sheet is ejected outside the printer.

The above reversing unit 40 includes an external cover 45 and a swing body 46. Specifically, the external cover 45 of the reversing unit 40 is supported so as to pivot about the pivot 40*a* provided that the housing of the printer body is provide with. This pivoting allows the external cover 45 to be opened and closed with respect to the housing together with the swing body 46 held inside the external cover 45.

As indicated by the dotted line in the figure, when the external cover 45 is opened together with the swing body 46 inside the external cover 45, the sheet feeding path 31, the secondary transfer nip, the post-transfer conveyance path 33, the fixing nip, the post-fixing conveyance path 35, and the sheet ejection path 36 between the reversing unit 40 and the printer main body side are vertically divided into two and exposed outside. This exposure facilitates removal of a jammed sheet in the sheet feeding path 31, at the secondary transfer nip, in the post-transfer conveyance path 33, at the fixing nip, in the post-fixing conveyance path 35, or in the sheet ejection path 36.

With the external cover 45 opened, the swing body 46 is supported by the external cover 45 so as to rotate about a swing shaft that the external cover 45 is provided with. When the swing body 46 is opened with respect to the external cover 45 by this rotation, the pre-reverse conveyance path 41 and the reverse conveyance path 44 are vertically divided into two and exposed outside. This exposure facilitates removal of a jammed sheet in the pre-reverse conveyance path 41 or the reverse conveyance path 44.

The upper cover 50 of the housing of the printer is supported so as to be pivotable about a pivotal member 51 as indicated by the arrow in the figure, and pivots counterclockwise in the figure to be opened with respect to the housing. Then, the upper opening of the housing is exposed largely.

An optical sensor unit 29 is disposed on the left of the intermediate transfer belt 16 in the figure. The optical sensor unit 29 faces a portion of the intermediate transfer belt 16 wound around the driving roller 17 from the front face side through a predetermined gap. The optical sensor unit 29 detects a patch image (rectangular solid toner image) in a shift-detection image (to be described later) formed on the intermediate transfer belt 16.

Hybrid Printer

Figure 11D:
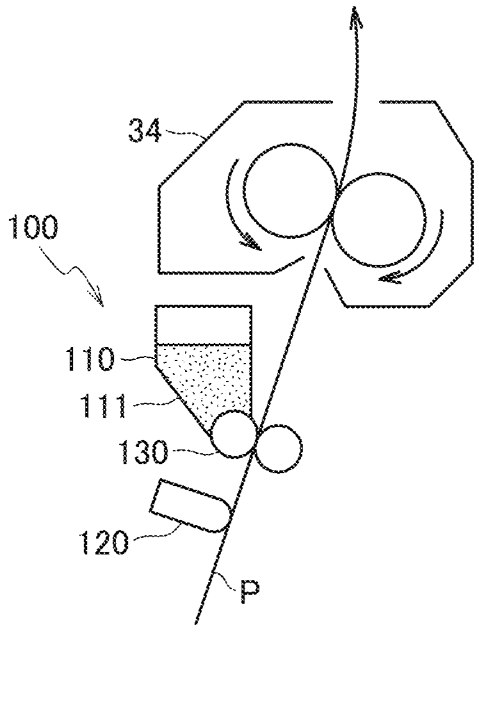
FIG. 11D is a view in which the image forming apparatus of FIG. 1A is incorporated immediately before a fixing device.

FIGS. 11C and 11D are schematic configuration views of a hybrid printer in which the uneven-image former according to the embodiments of the present disclosure is incorporated in such a conventional electrophotographic image forming device as in FIGS. 11A and 11B described above. This hybrid printer includes at least the particle tank 110 and the adhesive agent tank 120 of the uneven-image former 100 according to the embodiments of the present disclosure disposed between the photoconductor 2K and the fixing device 34.

Figure 12:
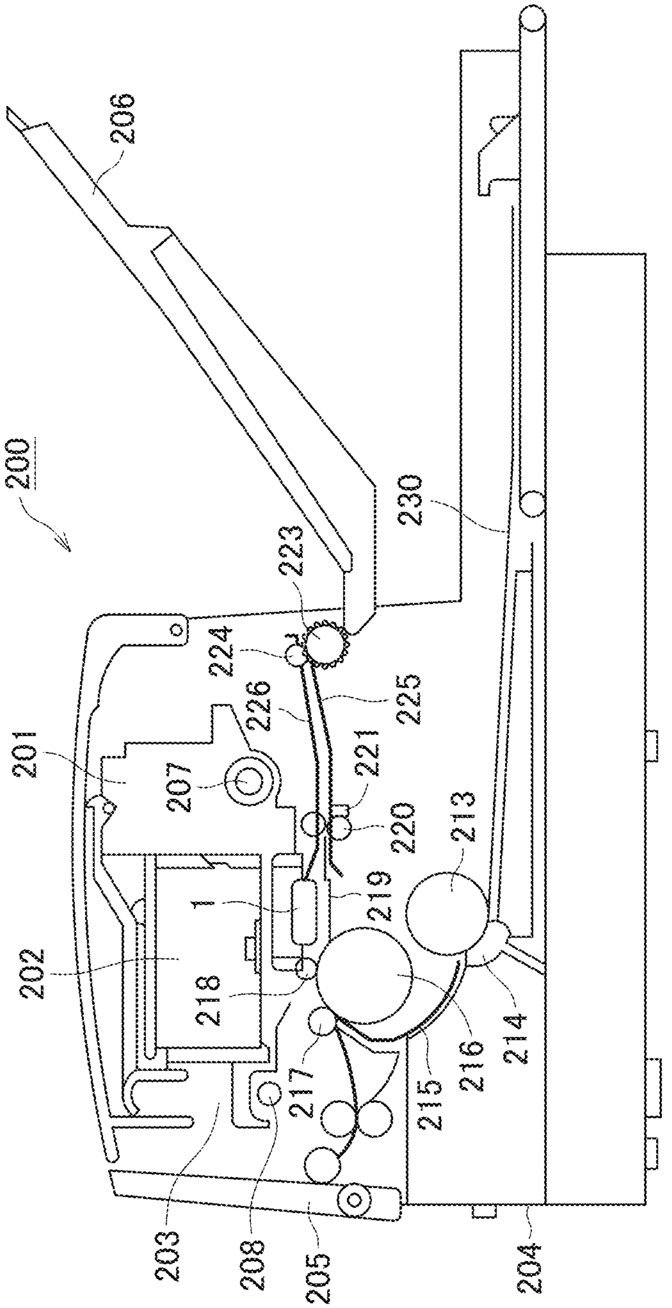
FIG. 12 is a schematic configuration view of an inkjet image forming device.
Figure 13:
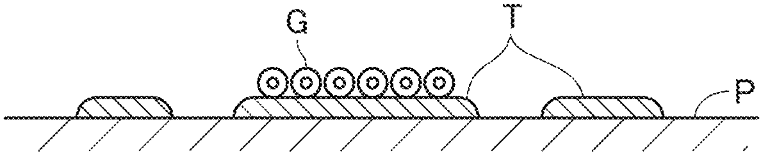
FIG. 13 illustrates a toner image and a particle layer formed on a sheet by the image former of FIG. 11C.

Alternatively, can be provided a hybrid printer in which the image former according to the embodiments of the present disclosure is incorporated in such a conventional inkjet image forming device 200 as illustrated in FIG. 12. With such a hybrid printer, as illustrated in FIG. 13, can be additionally formed an uneven image with large-diameter particles G by sequentially superimposing an adhesive agent AD and the particles G on a planar image (toner image T) on a sheet P by the conventional image forming device.

The inkjet image forming device 200 includes a printing mechanism 203 and others housed in the main body of the inkjet image forming device 200, and a sheet feeding cassette (or sheet feeding tray) 204 on which a large number of recording sheets 230 can be stacked from the front side is detachably attached to a lower portion of the main body. The inkjet image forming device 200 further includes a manual sheet feeding tray 205 that is opened for manually feeding such a recording sheet 230 as described above. The recording sheet 230 fed from the sheet feeding cassette 204 or the manual sheet feeding tray 205 is taken in, and a desired image is recorded by the printing mechanism 203. Then, the recording sheet 230 is ejected to a sheet ejection tray 206 attached to the rear face side.

The printing mechanism 203 includes a carriage 201 movable in the main scanning direction, a discharge head mounted on the carriage 201, and an ink cartridge 202 that supplies ink to the discharge head. The printing mechanism 203 further includes a main guide rod 207 as a guide member and a sub-guide rod 208 laterally bridged on left and right side plates. The main guide rod 207 and the sub-guide rod 208 hold the carriage 201 slidably in the main scanning direction.

The carriage 201 includes such discharge heads as described above that discharge ink droplets of respective colors of yellow (Y), cyan (C), magenta (M), and black (Bk). The discharge heads each have a plurality of ink discharge ports (nozzles) arranged in a direction intersecting the main scanning direction. The plurality of ink discharge ports (nozzles) faces downward. Further, such ink cartridges 202 as described above for each supplying ink of corresponding color to the corresponding discharge head are replaceably attached to the carriage 201.

The ink cartridges 202 are each provided with an atmosphere port communicating with the atmosphere on the upper side, and a supply port for supplying ink to the corresponding discharge head on the lower side. The ink cartridges 202 each have a porous body filled with the ink inside the ink cartridge 202, and the capillary force of the porous body maintains the ink supplied to the corresponding discharge head at a slight negative pressure. The discharge head of each color is used as the discharge head; however, a single discharge head having a nozzle that discharges ink droplet of each color may be provided.

Here, the carriage 201 is slidably fitted to the main guide rod 207 on the rear side (downstream side in the sheet conveyance direction), and slidably placed on the sub-guide rod 208 on the front side (upstream side in the sheet conveyance direction). In order to cause the carriage 201 to move and scan in the main scanning direction, a timing belt 212 is stretched between a driving pulley 210 and a driven pulley 211 that are rotationally driven by a main scanning motor 209*a*, and the timing belt 212 is secured to the carriage 201. With this arrangement, the carriage 201 is reciprocated in a direction perpendicular to the sheet face of FIG. 12 by forward and reverse rotation of the main scanning motor 209*a*.

In order to convey a recording sheet 230 set in the sheet feeding cassette 204 toward the lower side of the discharge heads, provided are a sheet feeding roller 213 and a friction pad 214 that separate and feed the recording sheet 230 from the sheet feeding cassette 204 and a guide member 215 that guides the recording sheet 230. Further, provided are a conveyance roller 216 that reverses and conveys the fed recording sheet 230, a conveyance rolling member 217 that is pressed against a peripheral face of the conveyance roller 216, and a leading-end rolling member 218 that defines the sending angle of the recording sheet 230 from the conveyance roller 216. The conveyance roller 216 is rotationally driven by a sub-scanning motor through a gear train.

A print receiving member 219 as a sheet guide member is provided in order to guide the recording sheet 230 sent from the conveyance roller 216 on the lower side of the discharge heads in accordance with the movement range of the carriage 201 in the main scanning direction. On the downstream side in the sheet conveyance direction of the print receiving member 219, a conveyance rolling member 220 and a spur 221 that are rotationally driven to send the recording sheet 230 in the sheet ejection direction. Further, disposed are a sheet ejection roller 223 and a spur 224 that send the recording sheet 230 to the sheet ejection tray 206 and guide members 225 and 226 that form a sheet ejection path.

At the time of recording by the image forming device 200, due to driving of a discharge head according to an image signal while the carriage 201 is moved, ink is discharged onto the stopped recording sheet 230 to record one row. After the recording, the recording sheet 230 is conveyed by a predetermined amount, and then recording for the next row is performed. When a recording end signal or a signal indicating that the rear end of the recording sheet 230 has reached the recording area is received, the recording operation is ended and the recording sheet 230 is ejected. Note that improved can be the fixability by incorporating the UV fixing device 170 of FIG. 10 into the hybrid type combined with an inkjet system and controlling the amount of UV irradiation during the operation of the carriage 201 (at the time of stopping sheet feeding).

Improvement in Visual Recognition of Planar Image

As illustrated in FIGS. 11C and 11D, when an uneven image with large-diameter particles G is additionally formed on a planar image by the conventional image forming device, the planar image (toner image T) is hidden below the uneven image with the large-diameter particles G as illustrated in FIG. 13. As a result, the visual recognition of the planar image (toner image T) may deteriorate.

Figure 14:
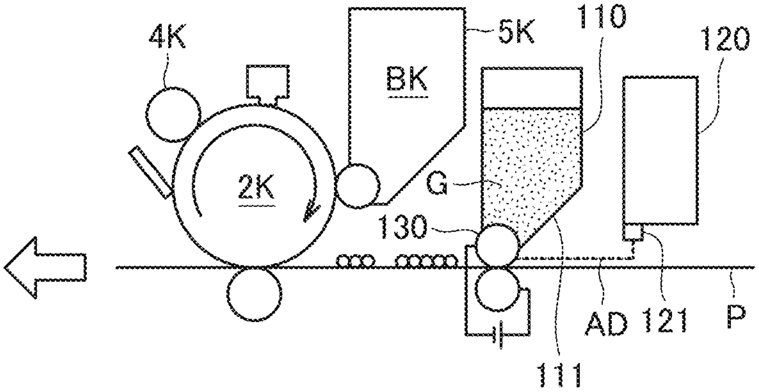
FIG. 14 is a view illustrating the image former of FIG. 1A incorporated upstream a photoconductor drum.

FIG. 14 illustrates that the formation order of a planar image (toner image T) and an uneven image is rearranged. That is, an uneven image with large-diameter particles G is formed at a stage before a planar image (toner image T) is formed on a sheet P by the conventional image forming device.

Figure 15:
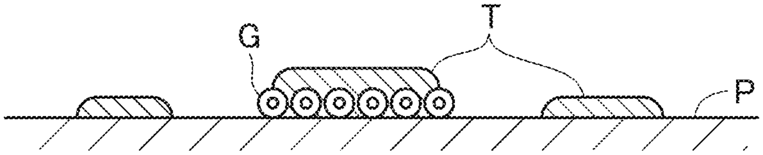
FIG. 15 illustrates a toner image and a particle layer formed on a sheet by the image former of FIG. 14.

After the formation of the uneven image with the large-diameter particles G, the planar image (toner image T) is formed by the conventional image forming device. According to this image forming method, the visual recognition can be ensured because the planar image (toner image T) is formed on the surface of the uneven image as illustrated in FIG. 15.

Ink for Forming Planar Image

Figure 16:
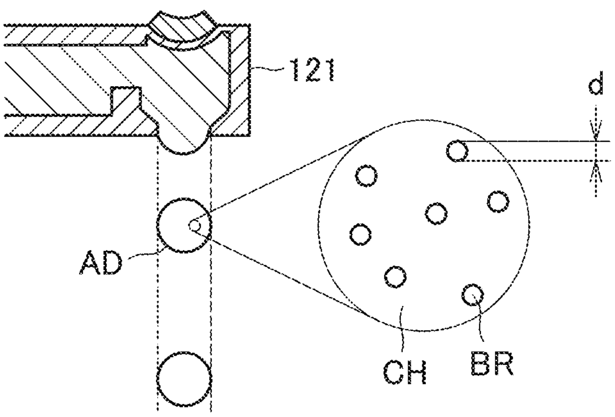
FIG. 16 is an enlarged view of ink for use for an inkjet printer.

Next, ink for forming a planar image will be described with reference to FIG. 16. Each ink used in the image forming device 200 of FIG. 12 contains fine particles containing a coloring material and a binder resin corresponding to the coloring material and the binder resin of the corresponding toner.

The fine particles are floating in a colloidal form in the ink liquid. Due to incorporation of the fixing device 150 of FIGS. 4A and 4B in the image forming device 200, the image stability corresponding to the image stability in an electrophotographic system can be obtained even in an inkjet system.

Particle Diameter of Large-Diameter Particle G

Figure 17A:
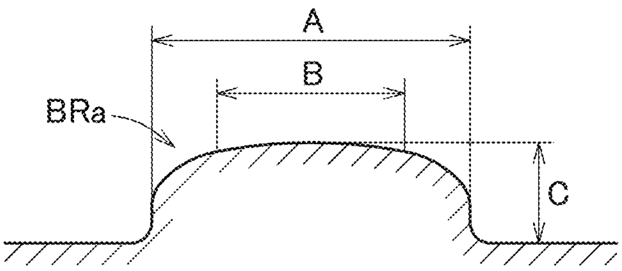
FIG. 17A is an enlarged cross-sectional view of a Braille character.
Figure 17B:
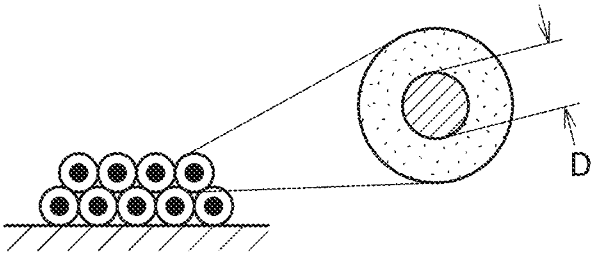
FIG. 17B illustrates a particle layer before melting.
Figure 17C:
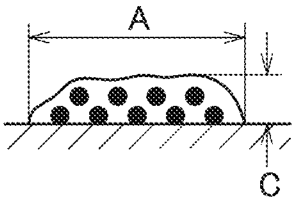
FIG. 17C illustrates the particle layer after melting.

FIGS. 17A to 17D illustrate the particle diameter of a large-diameter particle G. FIG. 17A illustrates the cross-section of a Braille character BRa. Typically, the diameter A of the Braille character BRa is 1.4 to 1.5 mm, the diameter B of the top flat face is 0.6 to 1.0 mm, and the height C is 0.3 to 0.5 mm.

Therefore, in order to express the Braille character BRa as an uneven image with a large-diameter particle layer, a thickness of 0.3 to 0.5 mm is preferable for the Braille character BRa. In order to form an uneven image with one or two large-diameter particle layers, the particle diameter D of each large-diameter particle G is desirably 300 to 500 μm.

Although the present disclosure has been specifically described on the basis of the embodiments, it is needless to say that the present invention is not limited to the embodiments and thus various modifications can be made within the scope of the technical idea described in the claims.

The invention claimed is:

1. An image forming apparatus comprising:

a latent image former to form a latent image with an adhesive on a base material; and a visualizer to cause particles to adhere to the latent image to visualize the latent image as an uneven image, the particles each containing an insoluble substance, wherein two or more latent image formers including the latent image former and two or more visualizers including the visualizer are alternately disposed along a conveyance path of the base material to form the uneven image in which the particles are stacked in two or more layers.

2. The image forming apparatus according to claim 1, further comprising:

an electrophotographic or inkjet image forming device configured to form a lower imaue on the base material, wherein the latent image former and the visualizer form the uneven image as an upper image on the lower image.

3. The image forming apparatus according to claim 2, further comprising:

a heat fixing device configured to heat and fix the lower image and the upper image on the base material, wherein the insoluble substance has a heat-resistant temperature equal to or higher than a fixing temperature.

4. The image forming apparatus according to claim 2, further comprising:

an ultraviolet (UV) light irradiator configured to irradiate the uneven image with UV light, wherein the UV light irradiator cures a UV-curable agent added to the adhesive to fix the lower image and the upper image on the base material.

5. The image forming apparatus according to claim 1, further comprising:

an electrophotographic or inkjet image forming device, wherein the latent image former and the visualizer form the uneven image as a lower image on the base material, and the electrophotographic or inkjet image forming device form an upper image on the lower image.

6. The image forming apparatus according to claim 1, wherein:

a periphery of the insoluble substance is covered with a coating layer containing a coloring material.

7. The image forming apparatus according to claim 1, wherein:

the insoluble substance is colorless and transparent.

8. The image forming apparatus according to claim 1, wherein:

a periphery of the insoluble substance is covered with a colorless and transparent resin containing no coloring material.

9. The image forming apparatus according to claim 8, wherein:

the adhesive contains a substance to be simultaneously foamed and cured by heat of 100° C. or higher.

10. The image forming apparatus according to claim 1, wherein:

the adhesive contains a substance to be cured by heat of 100° C. or higher.

11. The image forming apparatus according to claim 1, wherein:

the adhesive contains a release agent.

12. The image forming apparatus according to claim 1, further comprising:

an inkjet device configured to coat the base material with a coating agent by ink-jetting such that the particles each containing the insoluble substance adhere to the base material with the coating agent.

13. The image forming apparatus according to claim 1, wherein:

the particles each containing the insoluble substance each have a diameter of 20 μm to 500 μm.

14. An image forming apparatus, comprising:

a latent image former to form a latent image with an adhesive on a base material; and a visualizer to cause particles to adhere to the latent image to visualize the latent image as an uneven image, the particles each containing an insoluble substance, wherein the insoluble substance contains magnetic particles, wherein the visualizer includes:

a particle tank storing the particles each containing the insoluble substance; and a particle bearer disposed rotatably at a bottom of the particle tank, and wherein the particle bearer includes a magnet body having a surface covered with an elastic layer.

* * * * *